United States Patent [19]
Beelitz

[11] Patent Number: 6,029,237
[45] Date of Patent: Feb. 22, 2000

[54] METHOD FOR SIMULATING THE PRESENCE OF A DISKETTE DRIVE IN A NETPC COMPUTER THAT CONTAINS ONLY A HARD DISK DRIVE

[75] Inventor: Alan E. Beelitz, Austin, Tex.

[73] Assignee: Dell USA, L.P., Round Rock, Tex.

[21] Appl. No.: 08/947,138

[22] Filed: Oct. 8, 1997

[51] Int. Cl.[7] ........................................................ G06F 12/00
[52] U.S. Cl. ............................................ 711/173; 713/100
[58] Field of Search ..................................... 711/170–173; 713/1, 100

[56] References Cited

U.S. PATENT DOCUMENTS

| | | | |
|---|---|---|---|
| 5,537,540 | 7/1996 | Miller et al. | 395/183.14 |
| 5,706,472 | 1/1998 | Ruff et al. | 395/497.04 |
| 5,802,363 | 9/1998 | Williams et al. | |
| 5,974,517 | 10/1999 | Gaudet | 711/173 |

FOREIGN PATENT DOCUMENTS 2253929A  9/1992  United Kingdom .

*Primary Examiner*—Eddie P. Chan
*Assistant Examiner*—Kevin Verbrugge
*Attorney, Agent, or Firm*—Haynes & Boone, L.L.P.

[57] ABSTRACT

A system and method for re-mapping a logical reference to a computer storage device to another storage device. The computer includes a processor for running operating system code, RAM, and a hard drive memory device. The computer does not, however, have a floppy disk. The hard drive, which can be accessed by the processor, includes at least two partitions. When the computer boots up, operating system code running on the processor includes a first logical reference to the first partition of the hard drive and a second logical reference to the non-existing floppy disk. The logical references are stored in a table, located in RAM. If software routines running on the processor ever use the second logical reference, an error would normally occur. However, a reference-changing routine is provided for changing the logical reference from the non-existing floppy disk to the second partition of the hard drive. The reference-changing routine does this by altering the table with data from the second partition so that when the logical reference to the second storage device is used, the second partition of the first storage device is accessed.

18 Claims, 1 Drawing Sheet

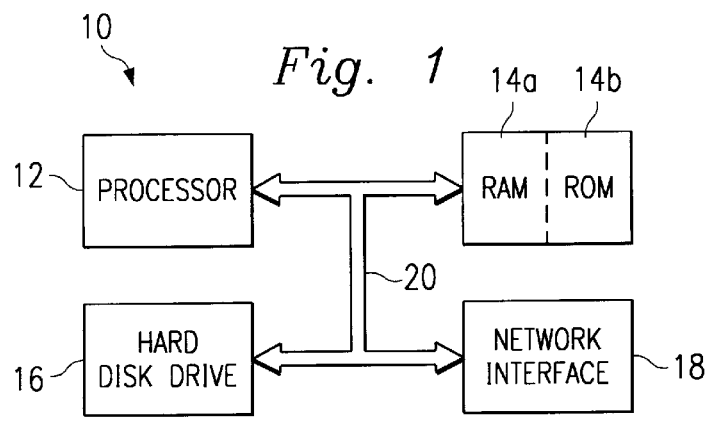
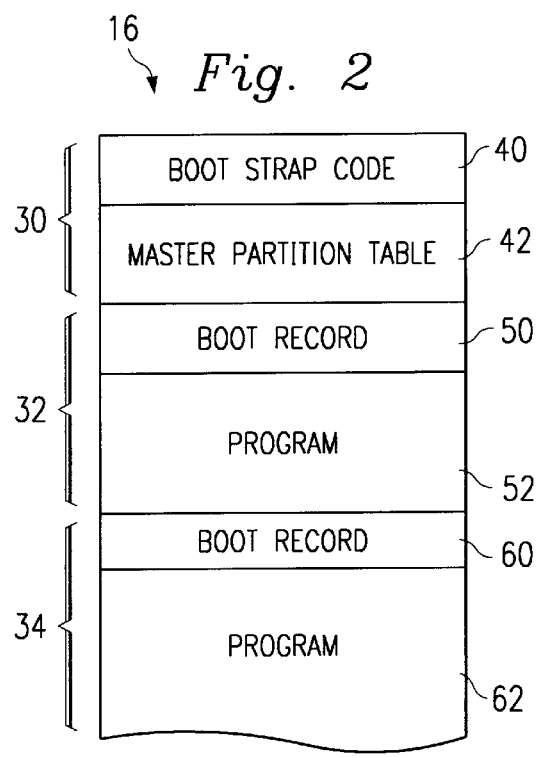
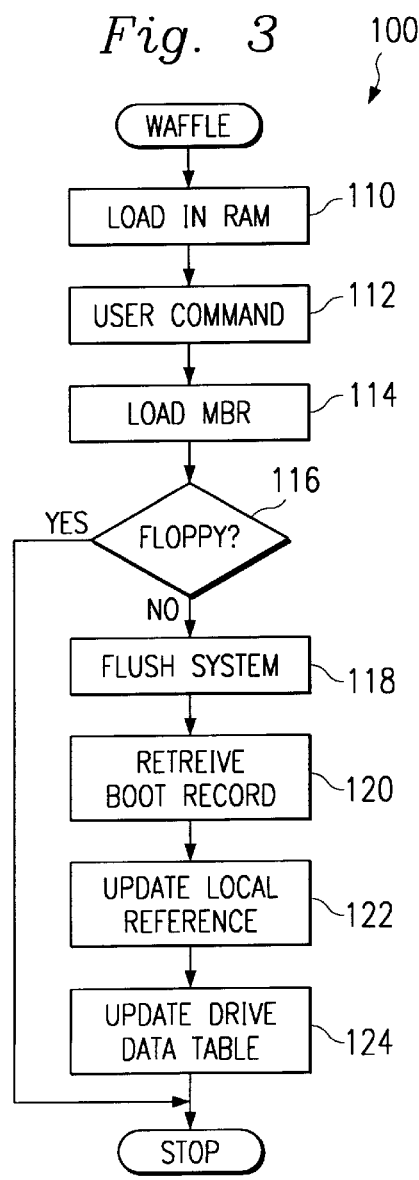

METHOD FOR SIMULATING THE PRESENCE OF A DISKETTE DRIVE IN A NETPC COMPUTER THAT CONTAINS ONLY A HARD DISK DRIVE

BACKGROUND

The present invention relates generally to computers and software code for controlling access to a computer storage device, and, more specifically, to a system and method for re-mapping a logical reference to a first storage device to a second storage device.

In certain computers, especially lower cost computers and network personal computers (NetPC's), a limited number of storage devices are provided. For example, most NetPC's will have a single hard disk but no floppy disk. While this configuration of storage devices will meet most requirements for these computers, some programs have specific, hard-coded references to the absent storage devices. Continuing with the NetPC example, when software is being downloaded to the NetPC during the computer's manufacturing process, often a software download process expects the computer to have a floppy disk. This is mainly due to the fact that the majority of computers do have a floppy disk and therefore hard-coded references to such drives are prevalent throughout the software download process. However, since in the present example no floppy disks exist, the software download process experiences numerous errors.

There are two typical solutions to this problem. One solution is to temporarily install a floppy disk in the NetPC during the software download process, and then later remove the drive. This solution is undesirable, however, because it is very time consuming and requires the existence of an extra floppy disk. The other solution is to modify the code in the software download process. This solution is also undesirable because the code is often used for many different computers, and thereby it is not desirable to change it. In addition, copyright and/or source code availability may prevent the code from being modified.

SUMMARY

In response thereto, provided is a system and method for re-mapping a logical reference to a first storage device to a second storage device. In one embodiment, a computer includes a processor for running operating system code, random access memory (RAM), and a hard drive memory device (the second storage device). The computer does not, however, have a floppy disk (the first storage device). The hard drive, which can be accessed by the processor, includes at least two partitions. When the computer boots up, operating system code running on the processor includes a first logical reference to the first partition of the hard drive and a second logical reference to the non-existing floppy disk.

The logical references are stored in a table, located in RAM. If software routines running on the processor ever use the second logical reference, an error would normally occur. However, a reference-changing routine is provided for changing the logical reference from the non-existing floppy disk to the second partition of the hard drive. The reference-changing routine does this by altering the table with data from the second partition so that when the logical reference to the second storage device is used, the second partition of the first storage device is accessed.

A technical advantage achieved with the present invention is that the first storage device is not required, even though certain software routines may attempt to access the first storage device.

Another technical advantage achieved with the present invention is that the re-mapping occurs in the computer's RAM, and therefore no permanent changes are made or required in any other software routines.

BRIEF DESCRIPTION OF THE DRAWINGS

FIG. 1 is a block diagram of a computer for implementing one embodiment of the present invention.

FIG. 2 is a layout diagram of a hard drive of the computer of FIG. 1.

FIG. 3 is a flow chart of a routine to be run by the computer of FIG. 1.

DETAILED DESCRIPTION OF THE PREFERRED EMBODIMENT

The following disclosure incorporates by reference U.S. patent application Ser. No. 08/984,386, entitled "Method for Changing Partition Mappings to Logical Drives in a Computer Memory Device" and U.S. patent application Ser. No. 08/950,545, entitled "Method for Updating Partition Mappings to Logical Drives in a Computer Memory Device", filed concurrently herewith.

Referring to FIG. 1, the reference numeral 10 designates a computer having several components, including a processor 12, a bank of random access memories (RAM) 14a and read only memories (ROM) 14b, a hard disk 16, and a network connection (interface) 18. Each component is capable of communication with the processor 12, as graphically represented by a general bus 20. In the present example, the computer 10 is a NetPC running Microsoft DOS operating system code (hereinafter DOS) as provided by Microsoft Corporation of Redmond, Wash. Also, the ROM 14b is stored on a network interface card (NIC) and contains remote initial program load (RIPL) code typical of a network-based computer. It is understood, however, that the NetPC 10 and its illustrated components are merely representative of many different types of computers and components and that DOS is merely representative of many different types of operating systems well known and understood by those of ordinary skill in the art.

Referring to FIG. 2, the hard disk 16 is subdivided into three different partitions: a master boot record 30, a utility partition 32, and a primary partition 34. Located in the master boot record 30 is boot strap code 40 and a master partition table 42. The master partition table includes code that represent data specific to each partition 32 and 34, as discussed in greater detail, below. It is understood that the additional software in the master boot record 30, including the boot strap code 40, is well known in the art and, for the sake of brevity, will not be further discussed.

In the present example, the primary partition 34 is active and DOS includes a logical reference value "C:" to the primary partition by storing information specific to the primary partition in a Drive Parameter Block ("DPB") and a Drive Data Table ("DDT"). The utility partition 32, however, is not active and no information about the utility partition is stored in the DPB or DDT. Such a configuration of the NetPC 10 is typical, thereby allowing special utility and maintenance software to be stored in the utility partition 32, yet keeping such software separate from software in the primary partition 34. Also in the present example, a software download process (not shown) includes hard coded references to a logical A: drive, which typically references a floppy disk. Since a floppy disk does not exist on the NetPC 10, the download process would conventionally encounter errors at the hard coded references to the logical A: drive.

Referring to FIG. 3, a routine 100 entitled "Waffle" allows the software download process to run without encountering any errors due to the hard coded references to the logical A: drive. Prior to Waffle 100 being run, the hard disk 16 is initialized or reconfigured, the utility partition 32 is marked inactive and the primary partition 34 is active. At step 110, Waffle 100 is loaded into RAM 14a and run. Waffle is a logical-reference-changing routine and, in the present embodiment, is accessed through the network connection 18. In addition, DOS is also accessed through the network connection 18 so that the NetPC 10 may be booted from the network. Alternatively, Waffle may be provided on either or both of the partitions 32 and 34 or accessed from another source. Although not further described, Waffle may contain several progress checkpoints during which Waffle will check specific values and notify the user of errors or other conditions.

At step 112, a command is received from a user. A command "virtual" indicates to Waffle that the user wants to convert an inactive partition into a virtual floppy disk. In the present example, the utility partition 32 would be made to emulate a logical A: drive.

At step 114, the master boot record 30 is loaded from the hard disk 16 into RAM 14a. At step 116, a determination is made as to whether the logical A: drive has already been mapped to the utility partition 32, i.e., a virtual (or an actual) floppy disk already exists. If it has, execution is stopped. Otherwise, execution proceeds to step 118 where the portions of RAM 14a not being used by DOS, Waffle, or to store the master boot record 30 are flushed. This step may perform several operations. For one, if the computer 10 includes one or more caches, including disk caches, the caches are flushed. Also, all open files in use by DOS or any other open application running on the computer are closed.

At step 120, the boot record 50 for the utility partition 32 is retrieved. At step 122, the operating system's logical reference for the floppy drive is updated. In the present example, this logical reference, which is stored with DOS in RAM 14a, is an "A:" drive. This is accomplished by using a BIOS Parameter Block ("BPB") from the utility boot record 50 to update a Drive Parameter Block ("DPB") in DOS. At step 124, the BPB from the primary boot record is also used to update a Drive Data Table ("DDT") for the logical drive reference A:.

Although illustrative embodiments of the present invention have been shown and described, a latitude of modification, change and substitution is intended in the foregoing disclosure, and in certain instances, some features of the invention will be employed without a corresponding use of other features. Furthermore, additional features, such as error handling routines, may be added to the illustrative embodiment without altering the scope of the invention. Accordingly, it is appropriate that the appended claims be construed broadly and in a manner consistent with the scope of the invention.

What is claimed is:

1. A computer comprising:
   at least one processor for running software including operating code;
   a first storage accessible by the processor, the first storage being separated into at least two partitions, a first partition being active and a second partition being inactive;
   the operating code including a logical reference to a second storage and including a table for mapping the logical reference to the second storage; and
   a routine for dynamically changing the logical reference to the second partition of the first storage in response to i) a user command and ii) a determination that the second storage is not accessible by the processor, wherein the reference-changing routine dynamically changes the logical reference to the second partition of the first storage by altering the table to convert the inactive second partition of the first storage into a virtual second storage, and
   wherein after the reference-changing routine alters the table, any references to the second storage are instead made to the second partition of the first storage.

2. The computer of claim 1, further comprising a memory system and wherein the reference-changing routine also flushes the memory system after changing the logical reference.

3. The computer of claim 2, wherein the memory system further comprises a disk cache and one or more open files and wherein the reference-changing routine flushes the memory system by flushing the disk cache and closing the one or more open files.

4. The computer of claim 1, wherein the reference-changing routine retrieves data from a boot record for the second partition, the data being used for altering the table.

5. The computer of claim 4, wherein the data includes a BIOS Parameter Block.

6. The computer of claim 5, wherein the table includes a Drive Parameter Block and a Drive Data Table.

7. The computer of claim 1, wherein the operating code includes a file management system and wherein the reference-changing routine also resets the file management system after changing the logical reference.

8. The computer of claim 1, further comprising a network interface device and wherein the reference-changing routine is accessed through the network interface device.

9. The computer of claim 8, wherein the operating code is accessed through the network interface device.

10. In a computer having a first storage device and a processor running operating code with logical references to the first storage device and a second storage device, a method for allowing a software process to reference the second storage device even if the second storage device is not accessible by the processor, the method comprising the steps of:
   dividing the first storage device into two partitions, the two partitions including a first partition and a second partition;
   defining the first partition as active and the second partition as inactive; and
   in response to a user command, performing the steps of:
      loading a boot record for the second partition and retrieving a BIOS Parameter Block therefrom;
      determining if the second storage device is accessible by the processor; and
      if the second storage device is not accessible by the processor, updating the logical reference value to the second storage device with information retrieved from the BIOS Parameter Block.

11. The method of claim 10, wherein the step of updating comprises updating a Drive Parameter Block and a Drive Data Table in the operating code.

12. The method of claim 10, wherein the computer includes an open file and a cache, the method further comprising flushing the cache and closing the open file.

13. A program for use in a computer including a first storage device, a processor capable of accessing the first storage device, and operating code with logical references to the first storage device and to a second storage device, wherein the first storage device is divided into two partitions, the first partition being active and the second partition being inactive, the program comprising:

instructions for loading, in response to a user command, a boot record for the second partition of the first storage device and retrieving a BIOS Parameter Block therefrom;

instructions for determining, in response to the user command, if the second storage device is accessible by the processor; and instructions for updating, in response to the user command and a determination that the second storage device is not accessible by the processor, the logical reference to the second storage device with information retrieved from the BIOS Parameter Block so that if the processor attempts to access the second storage device using the logical reference for the second storage device, the processor instead will access the second partition of the first storage device.

14. The program of claim 13, wherein the instructions for updating comprise updating a Drive Parameter Block and a Drive Data Table in the operating code.

15. The program of claim 13, wherein the computer includes an open file and a cache, the program further comprising instructions for flushing the cache and closing the open file.

16. The program of claim 13, further being stored on a network and accessible by the processor through the network.

17. The program of claim 13, further being stored on the first storage device.

18. The program of claim 13, further being stored on a third storage device and accessible by the processor through the third storage device.

* * * * *